United States Patent [19]

Visioli

[11] Patent Number: 5,654,061
[45] Date of Patent: Aug. 5, 1997

[54] SULFIDE SCAVENGING PACKAGING MATERIALS

[75] Inventor: Donna Lynn Visioli, Lower Gwynedd, Pa.

[73] Assignee: E. I. Du Pont de Nemours and Company, Wilmington, Del.

[21] Appl. No.: 477,740

[22] Filed: Jun. 7, 1995

Related U.S. Application Data

[63] Continuation-in-part of Ser. No. 373,825, Jan. 17, 1995, abandoned.

[51] Int. Cl.⁶ .......................................... B32B 1/04
[52] U.S. Cl. ................ 428/76; 428/349; 428/68; 428/70; 428/913; 502/407; 502/517
[58] Field of Search ........................... 428/68, 76, 70, 428/34.9, 913; 502/407, 517; 55/70, 75

[56] References Cited

U.S. PATENT DOCUMENTS

| | | | |
|---|---|---|---|
| 3,141,912 | 7/1964 | Goldman et al. | 264/95 |
| 3,876,608 | 4/1975 | Anderson | 523/218 |
| 4,437,429 | 3/1984 | Goldstein | 119/1 |
| 4,699,892 | 10/1987 | Suzuki | 502/4 |
| 4,795,482 | 1/1989 | Gioffre et al. | 55/75 |
| 4,910,295 | 3/1990 | Bernier | 528/482 |
| 5,011,019 | 4/1991 | Satoh et al. | 206/530 |
| 5,013,335 | 5/1991 | Marcus | 55/70 |
| 5,284,892 | 2/1994 | Brodie, III et al. | 524/251 |
| 5,290,613 | 3/1994 | Shuetz | 428/34.9 |
| 5,429,743 | 7/1995 | Geus | 210/490 |

FOREIGN PATENT DOCUMENTS 61-120638  6/1986  Japan.

*Primary Examiner*—Nasser Ahmad

[57] ABSTRACT

A packaging material, which is capable of absorbing trace amounts of volatile odorous sulfur compounds particularly from food, is made from a structural support material which is preferably a polymer film, and a defined molecular sieve. The packaging material may be in the form of a film which forms at least one layer of a film package, or it may be in the form of a cap liner, or it may be in the form of an insert. Film materials may be oriented film or oriented shrink film. The molecular sieve may be defined either by its measured ability to adsorb hydrogen sulfide, or by certain physical and chemical structural parameters of the molecular sieve. These are pore-opening size, Si/Al atomic ratio, pore-structure dimensionality, and basicity.

6 Claims, No Drawings

SULFIDE SCAVENGING PACKAGING MATERIALS

CROSS REFERENCE TO RELATED APPLICATION

This application is a continuation-in-part of application, Ser. No. 08/373,825, filed Jan. 17, 1995, now abandoned.

BACKGROUND OF THE INVENTION

1. Field of the Invention

The present invention relates generally to packaging materials which enhance freshness by removing hydrogen sulfide and other odorous sulfur products from certain foods and non-food protein sources. More specifically, the packaging materials of the present invention comprise a defined molecular sieve enclosed by a polymer film or sheet, or embedded within a polymer film or sheet, particularly when the film or sheet is oriented, and even more particularly when it is also heat-shrinkable. The packaging materials may be used as a packaging structure (i.e., a package itself such as a film package), a layer of a film package, or a package insert such as a coupon or liner.

2. Description of Related Art

In food packaging, the principle emphasis in relation to odor removal has been with the packaging material itself. Many polymeric packaging materials produce odors which can impart an undesirable odor to the food. Various additives have therefore been added to the polymer to remove its odor. However food itself, even while it remains in good condition, can produce undesirable odors, and some of the odor producing substances have such a low odor threshold that trace mounts are undesirable. In addition, trace amounts of such substances can produce an off-taste in food.

Sulfur compounds having undesirable odor can originate from proteins and free amino acids in foodstuffs. They may originate from sulfur-containing amino acids of fresh, cooked or preserved foods including meats particularly poultry, cheese, dairy products, eggs and ovalbumin. Among these are sulfur-containing compounds, including hydrogen sulfide, mercaptans, sulfides and disulfides. These sulfur compounds can discolor cans containing such food, and there has been an abundance of work directed to can coatings to prevent this discoloration. However, a more important aspect is the presence of the odor, and often an associated taste, in the food itself. The odor threshold of some of these is very low (10 micrograms/liter or less) so that even small amounts can, as noted, be very objectionable well before any real deterioration of the food has occurred.

Packaging materials are commonly polymeric films. These may be essentially unoriented, or oriented in either one or two directions. Oriented films may also be heat shrinkable. Orientation of films may be used merely to improved mechanical properties. There is a vast patent literature of preparation of oriented films. Orientation is carried out in controlled temperature ranges typically well below melt processing temperatures, and commonly near the melting point or glass transition temperature, where molecular orientation occurs and the film does not tear. The temperatures allow sufficient mobility to orient, yet sufficient lack of fluidity to hold the orientation until the film is cooled or quenched. Oriented films may be annealed to reduce or remove any heat-shrinkable nature, or they may be oriented and subsequently treated in such a way as to provide and maintain a heat-shrinkable nature. Typically, the film is cooled in the stretched state and upon subsequent heating, the film shrinks in seeking to recover to its original dimensional state.

U.S. Pat. No. 3,141,912 describes a process for making heat shrinkable film that has achieved considerable commercial utility. Here the polymer is extruded into a film tube which is then quenched to a temperature below the orientation temperature range, and is reheated to the orientation temperature range, followed by biaxially stretching of the film of the tube while within this temperature range. The biaxial stretch is done by (a) using internal gas pressure to expand the diameter of the tube to form a large 'bubble' and (b) advancing the expanded tube at a faster rate than the extrusion rate so as to obtain transverse and machine direction orientation. The patent is hereby incorporated by reference.

U.S. Pat. No. 4,820,557 discloses the manufacture of multilayer heat shrinkable film in which one of the layers is a linear copolymer of ethylene with either 1-octene or 1-hexene.

U.S. Pat. No. 4,597,920 discloses the manufacture of heat shrinkable film by the process of U.S. Pat. No. 3,141,912 wherein the linear copolymer is of ethylene with at least one C8–C18 alpha-olefin. The commercial shrink film of ethylene/1-octene of this process is called Clysar® LLP shrink film. The U.S. Pat. No. 4,597,920 is hereby incorporated by reference.

Oriented, and particularly heat-shrinkable film can be particularly adaptable to packaging, including food packaging. Continuous packaging machines which pack chicken parts in a tray, for instance, may advantageously employ shrink film.

Many materials can remove sulfides by reaction with them. Metal oxides, particularly zinc oxide have been used. Industrially, removal of sulfides in various processes is often carried out by reaction. In general, using chemical reactions to remove sulfides is fine in chemical processes, but not very suitable for food use, both because of toxicity concerns and the difficulty of controlling any such process. Adsorption is an alternative to reaction. Many adsorbers are unsuitable for contact with food. However, while several adsorbents may be entirely suitable for contact with food, there appears to be no work directed specifically to removing trace amounts of sulfur-compound related odors from food with their use.

Packaging materials capable of scavenging specific decomposition products from food have been disclosed in U.S. Pat. No. 5,284,892 (Brodie and Visioli). Specifically, aldehydes are scavenged by a polyalkylene imine of greater than 800 molecular weight. The imine is incorporated into a packaging film or sheet. Similar scavengers are disclosed in allowed patent application, Ser. No. 08/176,740, which extends their use to packaging structures which include liners, inserts and the like. Polyalkylene imines are unsuitable for direct food contact, and so when used, the required packaging structure has to ensure that the imine does not contact the food.

Molecular sieves are materials of varying composition which have a three dimensional cage like structure which form channels with defined mouth opening (aperture or pore-opening) sizes. They may be naturally occurring materials, modified natural materials, or essentially synthetic. They include silicas, metalloaluminates, aluminophosphates and various others. The silicas may by subdivided into titanosilicates, aluminosilicates, gallosilicates, ferrisilicates, borosilicates, chromosilicates and others. Among the aluminosilicates are the zeolites. Specific zeolites have been used for different purposes including catalysis, sieving and adsorption. Typically, zeolites are defined by parameters such as Si/Al ratio, their pore-opening size and structure, acidity, the cations present and others.

Clays may also be aluminosilicates also containing magnesium, but typically have a laminar structure, not a three dimensional structure.

Japanese published application, J61,120,638A discloses an adsorbent composite for packaging consisting of a polyolefin related resin and an adsorbent. The adsorbent is broadly disclosed to be any of a diverse range of materials including silica gel, activated alumina, acid clay, activated clay, zeolites or active carbon. Uses include dehumidifying and deodorizing pharmaceuticals, foods, or precision machines.

U.S. Pat. No. 4,795,482 (Gioffre et at.) discloses a process for removing odors from an 'environment', using certain specific hydrophobic, high silica zeolites and so-called silica polymorphs. Odors removable include those caused by a vast range of volatile materials including certain acids, aldehydes, organic nitrogen contain compounds and sulfur compounds including mercaptans and sulfides. Applications include powders, sprays, pads, creams, mouthwash, and non-woven tissues for treatment of odors in bathrooms, kitchens, refrigerators etc.

U.S. Pat. No. 5,011,019 (Satoh et at.) discloses a packaging structure for packaging medicines which may emit foul odors caused by substances such as carbonic acid, trimethylacetic acid and hydrogen sulfide. The package enclosing the medicine has a metal press-through side, and a multilayer polymer side, one layer of which is an polyolefin layer which incorporates deodorizing materials. The deodorizing materials mentioned as suitable include inorganic metal salts, favonoid, and unspecified molecular sieves.

There remains a need in the art for a packaging material, particularly in the form of oriented film which may also be heat-shrinkable, which can be used safely in contact with food, used either as a package itself, or as a packaging insert, specifically designed to remove hydrogen sulfide, mercaptans, sulfides and other odorous sulfur compounds from the specific foods which generate this odor, thus increasing shelf life.

SUMMARY OF THE INVENTION

The present invention is directed to novel packaging materials which form packaging structures or package inserts capable of adsorbing sulfur-compound odors generated by certain foods. The packaging material comprises a particulate aluminosilicate or silica molecular sieve, and an associated structural supporting component in the form of oriented film, and especially heat-shrinkable film.

In the broadest aspect of the invention, the molecular sieve suitable in the packaging material may be functionally defined as any aluminosilicate or silica having a zeolite-type structure where 5 mg. of it is capable of adsorbing at least 25% of hydrogen sulfide present in a GC vial of volume 22.5 ml. at a concentration of 12,000 ppm, in 15 minutes at a temperature of 25±2 deg. C.

Alternatively, the molecular sieve may be structurally defined as an aluminosilicate or silica having a zeolite-like structure which has a three dimensionally-connected pore-structure all of whose pores-openings have a minimum diameter of about 4 Angstroms, a Si/Al atomic ratio of 1 or greater, and has substantially all of any associated cations those of the metals of group 1A and group 2A metals.

The associated structural supporting component may be in the form of a film or sheet, particularly oriented film, either enclosing the molecular sieve or acting as a matrix having the molecular sieve embedded in it. The oriented film may further be heat-shrinkable. The supporting component must be permeable to sulfides and mercaptans. When the molecular sieve is embedded in the supporting component it is present at a level of from 0.1 to 10 weight percent, preferably from 0.5 to 5 weight percent.

The packaging materials comprising the molecular sieve and the associated supporting component may be formed into a package structure itself, the packaging material forming the package walls or part of the package walls, such as a layer in a laminate. Or it may be in the form of an insert such as a coupon, a cap liner and the like.

DETAILED DESCRIPTION OF THE INVENTION

In literature on molecular sieves the words or phrases 'channel', 'pore' 'pore-structure' 'aperture', 'pore-opening size' and 'pore-size' tend to be used loosely, some with considerable interchangeability. In this disclosure we describe the materials as having 'channels' which form an overall 'pore-structure'. The openings through which molecules can penetrate we will refer to as 'pore-openings' having a 'pore-opening size'. They will be described as 'powders'consisting of 'particles'.

Molecular sieves can reasonably be said to either absorb or adsorb gases to describe the same gas take up. In this disclosure the words adsorb and adsorption are preferred.

While there are a large number of materials which can react with sulfides, mercaptans and other sulfur compounds, as well as a large number of adsorbents of various types which can absorb various gases, surprisingly, in an investigation of many materials and adsorbents tried as sulfide odor removers, only a few defined molecular sieves have been found which are suitable to form part of the packaging materials of this invention. Even among molecular sieves, many are quite unsuitable, and only those with very specific characteristics are useful.

First and foremost, the molecular sieves of this invention are aluminosilicates or silicas having a zeolite-type structure. Many other metallosilicates are known, but the aluminosilicates and silicas have the major advantage of being, in general, non-toxic, and suitable for use where contact with food can or does occur. Furthermore, when blended with many polymer films, the film remains transparent, which is a major advantage in packaging films. This is because, the particle size is sufficiently small—typically, from about 0.1 to 10 microns. The lack of toxicity contrasts with packaging materials described in U.S. Pat. No. 5,284,892, where the structure of the packaging material must prevent contact of a polyalkylene imine with food, due to it lack of acceptability in this regard. In the present invention, while it is preferred not to have small amounts of the adsorbent mixing with the food, with these materials there is no toxicity problem should they do so. Indeed, many such materials are actually used in food. Thus certain zeolites are used as moisture adsorbers admixed with table salt to allow it to pour freely.

While the primary use of the materials invention of this invention is for food packaging, use to package other products which emit sulfur-related odors, such as preparations to alter structure of non-food proteins, such as home permanent wave preparations is also contemplated.

The suitable molecular sieves of this invention are aluminosilicates or silicas having a zeolite-type structure, which are capable of absorbing a specific amount of hydrogen sulfide from an atmosphere containing it. Specifically, they are those where 5 mg. of it is capable of adsorbing at least 25% of hydrogen sulfide present in a GC vial of volume 22.5 ml. at a concentration of 12,000 ppm, in 15 minutes at a temperature of 25±2 deg. C. It is within the skill of the artisan to determine readily whether any particular molecular sieve is suitable by this simple test.

Alternatively, the suitable molecular sieve may be defined in structural terms. The critical structural parameters suitable for selecting the aluminosilicate and silica molecular sieves for the purposes of this invention are known for many such materials, but those parameters have not been determined for many others. Thus it may be immediately possible to say a given aluminosilicate or silica is suitable for use in the present invention if those parameters are known. In cases where those parameters are not known, the functional testing described above will determine suitability.

In order to describe these critical structural parameters which determined suitability, it is first necessary to describe the structure of the particular molecular sieves which are useful in the invention.

The molecular sieves which form part of the packaging materials of this invention are complex aluminosilicates or silicates characterized by a three-dimensional framework structure, enclosing cavities and channels. (These are often also referred to loosely as pores; the ends of the channels are usually described as pore-openings, or apertures, and the system of channels is said to have a pore structure). The channels may be occupied by ions and water molecules, all of which can move with significant freedom within the zeolite matrix. The water molecules can be removed or replaced without destroying the essential geometry. They may be naturally occurring, modified naturally occurring materials, or synthesized. They can be represented by the formula:

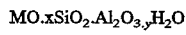

$MO.xSiO_2.Al_2O_3.yH_2O$ though the aluminum may approach zero, in which case the material will be referred to as a crystalline silica (not silicate). M is a cation of valence n, where the cation may be metallic or a proton. In those naturally occurring molecular sieves commonly known as 'zeolites', x is generally from about 2 to 8. And y may be 1 or more. There also exist synthesized, so-called high silica zeolites, and more generally aluminosilicate molecular sieves with extremely high levels of silica to alumina, approaching infinity; that is to say only trace amounts of aluminum are present. In that case, the material is, as noted above, essentially a silica. The cation is associated, primarily, only with the alumina, so that the less aluminum present the fewer cations. For the purposes of this invention, the term molecular sieve will be used, because the term zeolite is often defined as a material having a specific amount of aluminum, and at very low aluminum levels, approaching trace amounts, most common usage of the term zeolite would exclude such materials.

In naturally occurring zeolites, M is Na, Ca, K, Mg and Ba in varying proportions. The cations can be changed by ion exchange, and other ions such as Cs or Sr can be introduced. The structure consists of corner-linked tetrahedra with Al or Si atoms at the centers and oxygen at the corners. The tetrahedra are combined into repeat structures of 4 to 12 membered rings resulting in a framework with regular channels and 'cages' at channel intersections. The channels may be one dimensional (i.e.,tubular) with the tubes not connected, two dimensional where channels branch to other channels, but each series of two dimensional channels is no connected, or a three dimensionally-connected system of channels. Here molecules which are sufficiently small can travel freely throughout the channel system or pore-structure. In some cases there are two separate interpenetrating (but not connected) three dimensionally-connected systems. The channels and cages impart a pore-structure with differing dimensions which are critical to movements of molecules into and within the channels and cages, the pore-openings controlling access to the interior of the zeolite. The pore-opening dimensions are determined not only by the tetrahedra forming the pore-opening, but by the ions in or near the pore-opening. In many cases the pore-opening is aspherical or generally asymmetrical, and can have a smallest and a largest diameter. The smallest diameter will clearly control access of molecules. Overall, the variations within the zeolite structure create a wide variation in utility for various zeolites. The same situation is true for molecular sieves even when the amount of aluminum approaches just trace amounts.

The molecular sieves suitable for this invention, have a Si/Al atomic ratio which can range from 1 to infinity. By infinity is meant none or only trace amounts of aluminum are present. The ratio may be determined by standard wet chemical methods or by atomic adsorption spectroscopy. In describing this type of material, it is common to use the ratio $SiO_2/Al_2O_3$ rather than Si/Al, since this characterizes the chemical units which make up the structure. However in this disclosure, the Si/Al atomic ratio is used. It is of course readily possible to calculate one from the other.

The molecular sieves of this invention also have a three dimensional pore-structure, and a minimum pore-opening size of about 4 Angstrom. Pore-opening size may be somewhat temperature dependent, and since adsorption in end use has to take place at ambient temperatures, the pore-opening size refers to the size which will be present at ambient temperatures, that is to say between about 20 and 30 degrees C. Methods of determining and calculating pore-opening size are well known in the art, and many molecular sieves have established pore-opening sizes.

Useful references generally relating to zeolite-type structure and characterization include the following: Meier et al., 'Atlas of Zeolite Structure Types' (International Zeolite Assn. 1978); Mumpton, 'Natural Zeolites' in Reviews in Minerology 14:1 (1977), and Smith, 'Origin and Structure of Zeolites' in Zeolite Chemistry and Catalysis, ACS Monograph 171, American Chemical Society, 1976.

If the pore-opening is asymmetrical, the 4 Angstrom minimum refers to the smallest diameter. In addition, the molecular sieve must be basic, in that substantially all (i.e. more than about 90%) the associated cations can not be hydrogen ions, but must be a metal ion of group 1A or 2A, preferably Na, Ca, Ba, Mg and K, preferably Na and Ca. Ion-exchange with other metals such as zinc (group 2B) are also possible. As the amount of aluminum approaches zero, the number of associated cations approaches zero, and the material will become increasingly neutral. Molecular sieves falling within these limitations are suitable.

The molecular sieve's pore-opening size will be large enough to let through the smallest odor causing sulfur compound molecules. The pore-opening size of molecular sieves is a fairly precisely definable quantity. The diameter of molecular species which are to be adsorbed however is more difficult to define. Various types of measurement have been used to determine diameter, and various methods of calculating different aspects of the size of the molecule have been used. When a molecule is unsymmetrical, as in longer chain mercaptans, it becomes difficult to know what dimension of the molecule is important in relation to its ability to enter a molecular sieve having defined minimum pore-opening size. There is a crude correlation between pore-opening size and molecular size. Hydrogen sulfide has a Lennard-Jones 'kinetic' diameter of 3.6 Angstroms and a Pauling length by width of 4.6×3.9 Angstroms. These numbers are in line with what has been found to be the minimum pore-opening size allowable for adsorption of hydrogen sulfide, namely a pore-opening size of about 4 Angstroms.

Hydrogen sulfide is the principle odor causing compound from foods which generate sulfur compounds. Other sulfur containing odor causing compounds of importance are slightly larger in size, but some have a much lower odor threshold than hydrogen sulfide. If we use a value of 4.23 Angstroms for the diameter of hydrogen sulfide, one calculation/measurement/estimate of the size of various odor-causing materials made by the inventors suggested the following sizes (in Angstroms): methylmercaptan 4.80; ethylmercaptan 5.22; dimethyltrisulfide 5.43; dimethylsulfide 5.63; and methional [3-(methylthio)propionaldehyde] 6.17. The odor threshold however is in quite a different order. Thus values quoted in 'Food Chemistry' by H. D. Belitz et al. 1987, gives the following values in micrograms per liter: hydrogen sulfide 5; methymercaptan 0.02; ethylmercaptan 0.008; dimethyltrisulfide 0.01; dimethylsulfide 1.0; and methional 0.2. While, as will be described below, sieves with a minimum pore-opening of about 4.0 Angstroms adsorb hydrogen sulfide provided the other structural parameters are met, for adsorption of other odor-causing sulfur compounds, it is preferred to have a pore-opening size of greater than about 5.5 Angstroms.

There is no particular particle size limitation for the molecular sieve. However, for adequate surface area for rapid adsorption, it is preferred that the particles be from 0.1 to 5 microns. When molecular sieve particles are incorporated into a film layer of a package (i.e., as a filler), the particles should preferably have an average diameter less than half the film thickness, and a size distribution such that no particles have a diameter as thick as the film, and preferably less than three quarters of the thickness of the film. This represents no real problem, since a 1 mil. (25 micron) film could have particles, by this criterion, of 12 microns in diameter which is higher than typical sieve particles. The adsorbent layer may be from about 1 to 5 mils.

The particulate molecular sieve adsorbent obviously is not mixed directly with the food, and is kept separate from it. The adsorbent is part of a packaging material, the packaging material comprising the adsorbent and an associated structural supporting component. By this, is simply meant another material which contains (i.e. as a filler), encloses, or otherwise supports the particulate adsorbent so that the individual adsorbent particles can not readily separate from the packaging structure and mix with the food. Thus, the adsorbent may be melt blended, just as with any particulate filler, into a polymer which is then made into a film which forms the walls of a package container, herein referred to as a 'film package', or part of the walls of a packaging container. The package may by a film pouch. The pouch of course may be further enclosed in some other packaging material such as a cardboard carton.

The packaging material of the invention when it is in the form of an adsorbent-filled film may be one layer of a multilayered film or sheet, with other co-extruded or laminated and adhered layers acting as water or oxygen barriers etc. If there are other layers, the absorbent-filled layer may be the layer which contacts the food, unlike the situation where the adsorbent is not suitable for food contact such as polyethylene imine aldehyde scavengers. It may however be another layer, provided any inner layers (those between the adsorbent layer and the food) are permeable to the odor-causing sulfur compounds, so that they may pass through it to contact the adsorbent-filled layer. For instance the inner layer could not be a metallic film layer or highly crystalline polymer or poly(vinylidene) chloride which is a useful barrier. If there is an inner layer, it should not be more than 3 mils thick.

The invention can advantageously employ various sorts of oriented and shrink film. Typical shrink films which may be used in this invention are Clysar® shrink films, which is are various polyolefin copolymer films manufactured by E. I. du Pont de Nemours and company. They include mono- and multilayer films of polyethylene and polypropylene. The invention will be suitable for many other shrink films however. Incorporation of particles of such materials as silica into films, including shrink films, is routinely carried out, and is well known in the art. Incorporation of the absorbents of this invention will present no unusual difficulties, provided the limitations on particle size, as noted above, are met. The adsorbent may be incorporated into the film directly, during film extrusion, or made into a polymer concentrate to blend during the film extrusion process, before the orientation process.

Alternatively, the package material may not be part of the package itself, but may be a free insert, such as a coupon. Or it may be an insert which does forms part of the package, such as a cap liner. When the packaging material is a free insert, a possibility within the bounds of the present invention is that of the particulate adsorbent enclosed, i.e. encapsulated by a polymer film or other material, but not blended (i.e., as a filler) within it. Other materials which could be used to encapsulate molecular sieve particles are non-woven materials. These would act as ideal encapsulating materials since they are highly porous, provided the pores of the non-woven are not of a size which would let through the molecular sieve particles.

Polymers suitable as the associated structural supporting component are olefinic homopolymers such as polypropylene, polyethylenes such as LDPE, LLDPE and ULDPE, copolymers of ethylene and vinyl esters such as vinyl acetate, and copolymers of ethylene and unsaturated acid or esters of those acids such as acrylic or methacrylic acid, or 1–8 carbon alkyl acrylates and methacrylates, or mixtures of these comonomers. Also included are ionomers of ethylene/acrylic acid or methacrylic acid copolymers and terpolymers. Ionomers are the well known metal ion partially neutralized ethylene/(meth)acrylic acid copolymers, described in U.S. Pat. No. 3,264,272 (Rees) which is hereby incorporated by reference. The polymers preferred as the structural supporting component are polyolefines and polyolefin copolymers (i.e. with other alpha olefins).

In multilayer films used to form packages, one layer of which is the packaging material of the present invention, other layers may be an inner seal layer and outer barrier layers or merely outer bulk layers. Such multilayer films are well known in the packaging industry and there are endless variations of such films. The adsorbent layer is preferably separated from the food to be packaged only by one layer, that layer being a seal layer which contacts the food. Seal layers may be any of the polymers listed above as the structural supporting component, but preferably ionomers or ethylene vinyl acetate which are ideal adhesives. Other layers may be an oxygen barrier layer such as ethylene/vinyl alcohol copolymers, or a moisture barrier layer which may also be the bulk layer. Suitable polymers for this include polypropylene, polyethylene and polyethylene copolymers. The layers may have various adhesives tying them together, such as 'BYNEL' which is the name for certain modified polyolefins manufactured by E.I. du Pont de Nemours and company.

Test Methods

Different potential reactants or adsorbents were evaluated as hydrogen sulfide removers using GC. Either the reactant/adsorbent itself, or the reactant/adsorbent melt blended with a polymer at a level of 2 parts per 100 parts polymer were placed in a GC vial. Weight of the sample to be tested was 5 mg. when straight powdered adsorbent was tested, and about 8 square inches (4×2 inches) of film when film was tested.

Then enough hydrogen sulfide to provide 12000 ppm in the (air containing) vial (based on the volume of the vial which was about 21.5 ml.) or about 250 uL of pure hydrogen sulfide was injected into the vial. After fifteen minutes, the concentration of hydrogen sulfide remaining in the vial was measured. The concentration change was measured by taking out 250 uL of the mixed air/hydrogen sulfide from the vial, and measuring the hydrogen sulfide concentration using standard GC methods. The adsorption was calibrated against a similarly filled vial without adsorbent, to allow for adsorption by the vial septum and vial surface.

EXAMPLES

The invention is illustrated by the following examples.

In the following examples, in Series 1, samples of the potential absorbent were melt blended with 'ALATHON' 1540, a LDPE, manufactured by the Du Pont Co. at a 2 weight percent level, placed in a vial and evaluated as indicated above. A list of the potential adsorbents/reactants tried is shown in Table 1. Results are shown in Table 2. In Series 2, potential reactant/adsorbent was placed directly in the vial and evaluated as indicated above. Results are shown in Table 3. Some potential reactant/adsorbents were tested both in series 1 and 2. In other cases, if a reactant/adsorbent showed no potential in one or the other of the two series, (whichever was tried first with the material) it was not repeated in the other series.

Zeolite M5 (also known as Mordenite) has the required pore-opening sized, but has a one dimensional pore structure. That is to say it has unconnected single channels. Chabazite has a three dimensionally-connected pore structure, but the pore-openings in one of the three dimensions is less than 4 Angstroms. DAY-55 has the necessary pore size, the channels are connected into a three dimensionally-connected pore-structure, but it is acidic, having protons replacing metal ions. Such acidic materials also have the disadvantage of possible reaction with some of the polymeric packaging components of the packaging material. Zeolites 4A and 5A adsorbed some hydrogen sulfide alone, but not when incorporated into film. The minimum pore-opening is defined as about 4 Angstroms. In any particular sieve the actual minimum may be from 3.7 to 4.3 Angstroms. It is surmised that the effective diameter for these zeolites under test conditions maybe smaller than that quoted, at least in one direction. The zeolites with much larger pore-opening size, Y52 and 13X are clearly better and preferred.

Clays have a laminar structure, not a Zeolite-type three dimensional structure. The various clays tried generally do not perform well in films. They do typically contain a complex of Al2O3 and/or SiO2 and/or MgO, but the structure is inadequate. Bentonite does perform well when tested neat, but not in films. This may be related to interplanar spacing, between 'molecules', that spacing disappearing when blended with films. By contrast, the 3 dimensional structure of the zeolite-like structures remain essentially intact when blended with polymers.

TABLE 1

ABSORBENTS/REACTANTS EXAMINED

| SUBSTANCE ION | TYPE | DIMENSION-ALITY | PORE Diameter | Si/Al |
|---|---|---|---|---|
| Activated alumina | NA | NA | NA | NA |
| ZnO/TiO$_2$ (1) | NA | NA | NA | NA |
| ZnO?Zn phosphate (1) | NA | NA | NA | NA |
| ZnO/Al salt/Ni salt (1) | NA | NA | NA | NA |
| Mg Aluminate | NA | NA | NA | NA |
| Activated Carbon | NA | NA | NA | NA |
| VEEGUM A132A | NA | NA | NA | NA |
| VAN GEL B | NA | NA | NA | NA |
| Bentonite NF A Clay | NA | NA | NA | NA |
| Bentonite MPS A Clay | NA | NA | NA | NA |
| Magnebrite HS A Clay | NA | NA | NA | NA |
| Hectabrite DF A Clay | NA | NA | NA | NA |
| Laponite RD A Clay | NA | NA | NA | NA |
| Chabazite (CHA type Zeolite) | 3 | 3.8 × 3.8 | 2 | Ca |
| ABSCENTS 3000 (MFI Sieve) | 3 | 5.3 × 5.6 | >100 | ? |
| Zeolite 5A (LTA Zeolite) | 3 | 4.1 × 4.1 | 1 | Ca |
| Zeolite 4A (LTA Zeolite) | 3 | 4.1 × 4.1 | 1 | Na |
| Sieve S115 | (Same as Abscents 3000? Different particle size?) | | | |
| Zeolite DAY-55 | 3 | 7.5? | 55 | H |
| Zeolite M5 (MOR Zeolite) | 3/1 | 6.5 × 7/ 2.6 × 5.7 | 5 | Na |
| M. Sieve ETS-4 A titanosilicate | ? | <4.0 | NA | ? |
| M. Sieve ETS-10 A titanosilicate | ? | 8–10 | NA | ? |
| Zeolite Y52 FAU Zeolite | 3 | 7.4 × 7.4 | 2.5 | Na |
| Zeolite 13X FAU Zeolite | 3 | 7.4 × 7.4 | 1.25 | Na |

NA NOT APPLICABLE; ? = Not Known.
ZnO/TiO2 is Zn2TiO4—Zn2Ti3O8 from Alfa Inorganics.
(1) ZnO/Zn phosphate calcinated mix as prepared in U.S. Pat. No. 5,219.542
ZnO/Al salt/Ni salt calcinated mix as prepared in U.S. Pat. No. 5,174,919
Magnesium aluminate calcinated as prepared in U.S. Pat. No. 5,229,091
Zeolites 4A, 13X and Y52 from Alfa Inorganics.
Zeolite 5A and M5 (Mordenite) from Linde
Abscents 3000 and S115 from UOP Corp.
Molecular Sieves ETS-4 and ETS-10 from Englehard Corp.
Chabazite from Minerals Research, mined in Christmas AZ.
All Clays from American Colloid Company.
Activated Carbon, grade S-5 from Darco.
Zeolite DAY-55 from DEGUSSA. Corp.
VEEGUM A132A is purified smectite clay (hydrated magnesium aluminum silicate) from R. T. Vanderbilt Co.; VAN GEL B is smectite clay from Vanderbilt. Co. They are used in the oil industry to adsorb/react with sulfur compounds.
Zeolite three letter designations are those of the International Zeolite Association.

TABLE 2

ABSORBTION OF H2S BY POLYMER BLENDS

| SUBSTANCE | % H2S REMOVED |
|---|---|
| Act. alumina | 0 |
| ZnTi oxide | 0 |
| VEEGUM A132A | 0 |
| VAN GEL B | 0 |
| Mg Aluminate | 0 |
| ZnO—Al—Ni | 29 |
| Zno-Zn phosphate | 0 |
| ABSCENTS 3000 | 23 |
| Zeolite 5A | 0 |
| Zeolite 4A | 0 |
| Chabazite | 0 |
| Act. carbon | 7 |
| Zeolite S115 | 100 |

TABLE 2-continued

ABSORBTION OF H2S BY POLYMER BLENDS

| SUBSTANCE | % H2S REMOVED |
|---|---|
| Bentonite (MPS) | 100 |
| Magnebrite HS | 0 |
| Hectabrite DF | 3 |
| Laponite RD | 6 |

All film samples contained 2 weight percent of the ingredient. Films were extruded on a 28MM. co-rotating twin-screw Extruder, having an L/D of 28/1 and 2 mixing sections. A 10 inch film die was used to produce 1 mil film, at a melt temperature of 215–225 deg. C.

TABLE 3

ABSORBTION BY PURE ABSORBANT/REACTANT

| SUBSTANCE | % H2S REMOVED |
|---|---|
| ZnO—Zn phosphate (5.7 mg) | 9 |
| ZnO—Al—Ni (6.4 mg) | 100 |
| Zeolite 5A | 13 |
| Zeolite 4A | 17 |
| Zeolite 13X | 100 |
| Abscents 3000 | 54 |
| Zeolite Y52 | 86 |
| Zeolite M5 | 2 |
| Chabazite | 4 |
| Zeolite DAY-55 | 0 |
| M. Sieve S-115 | 40 |
| M. Sieve ETS-4 | 0 |
| M. Sieve ETS-10 | 19 |
| Magnebrite HS | 5 |
| Bentonite MPS | 4 |
| Bentonite NF | 4 |
| Hectabrite DF | 17 |
| Laponite RD | 6 |

Powder sample weight was 5 mg.

I claim:

1. A sulfur compound odor adsorption packaging material for adsorption of sulfur compound odors from foods or non-food protein sources, comprising:

a) a particulate aluminosilicate or silica molecular sieve having a three dimensionally-connected pore structure, having pore-openings of minimum diameter 4 Angstroms, a Si/Al atomic ratio of greater than 1, and all of any associated cations those of metals of group 1A or 2A of the Periodic Table, and b) an associated structural supporting component which is an oriented mono-layer polymer film containing said molecular sieve or multilayer polymer film comprising at least one barrier layer laminated to said molecular sieve containing layer, the molecular sieve being blended at a concentration of from 0.5 to 5 weight percent in the mono-layer film or molecular sieve containing layer of the multilayer film.

2. A food package consisting essentially of the packaging material of claim 1, enclosing food from which odor is to be adsorbed wherein the food is fresh, cooked or preserved, and is selected from the group consisting of cheese, meat, poultry, eggs, dairy products and oval bumin.

3. The packaging material of claim 1, wherein the oriented mono- or multilayer polymer film is a shrink film.

4. The packaging material of claim 1 wherein the associated cations are Na or Ca.

5. The packaging material of claim 4 wherein the minimum diameter of the pore-openings is 5.5 Angstroms.

6. The packaging material of claim 5, wherein the oriented polymer film is a shrink film.

* * * * *